(12) United States Patent
Gutacker et al.

(10) Patent No.: US 11,879,037 B2
(45) Date of Patent: Jan. 23, 2024

(54) PREPARATION OF POLYSILOXANE POLYALKYLENEGLYCOL BRUSH COPOLYMERS

(71) Applicant: Henkel AG & Co. KGaA, Duesseldorf (DE)

(72) Inventors: Andrea Gutacker, Langenfeld (DE); Johann Klein, Duesseldorf (DE); Annika Dietrich, Rostock (DE); Esteban Mejia, Rostock (DE); Therese Hemery, Wiesbaden (DE); Nayereh Mohebbati, Rostock (DE)

(73) Assignee: Henkel AG & Co. KGaA, Duesseldorf (DE)

(*) Notice: Subject to any disclaimer, the term of this patent is extended or adjusted under 35 U.S.C. 154(b) by 91 days.

(21) Appl. No.: 17/338,123

(22) Filed: Jun. 3, 2021

(65) Prior Publication Data

US 2021/0292488 A1  Sep. 23, 2021

Related U.S. Application Data

(63) Continuation of application No. PCT/EP2019/081898, filed on Nov. 20, 2019.

(30) Foreign Application Priority Data

Dec. 6, 2018  (EP) .................................. 18210646

(51) Int. Cl.
C08G 77/46 (2006.01)
C09D 183/12 (2006.01)
C08G 77/38 (2006.01)

(52) U.S. Cl.
CPC ............. *C08G 77/46* (2013.01); *C08G 77/38* (2013.01); *C09D 183/12* (2013.01)

(58) Field of Classification Search
None
See application file for complete search history.

(56) References Cited

U.S. PATENT DOCUMENTS

| | | | |
|---|---|---|---|
| 3,268,561 A | 8/1966 | Peppel et al. | |
| 3,723,491 A | 3/1973 | Rossmy et al. | |
| 4,618,703 A | 10/1986 | Thanawalla et al. | |
| 5,268,215 A * | 12/1993 | Krenceski | C08G 18/61 428/447 |
| 5,391,679 A * | 2/1995 | Burkhart | C08G 77/38 528/14 |
| 5,536,883 A | 7/1996 | Le-Khac | |
| 5,663,269 A | 9/1997 | Chu et al. | |
| 5,767,323 A | 6/1998 | Televantos et al. | |
| 5,856,369 A * | 1/1999 | Jorgenson | C08G 65/2663 521/112 |
| 6,162,888 A | 12/2000 | Lee et al. | |
| 8,334,355 B2 * | 12/2012 | Henning | C08G 77/46 252/182.14 |
| 9,073,836 B2 | 7/2015 | Klumpe et al. | |
| 9,283,164 B2 | 3/2016 | Furukawa et al. | |
| 9,458,286 B2 | 10/2016 | Zander et al. | |
| 10,273,335 B2 | 4/2019 | Helpenstein et al. | |
| 2003/0069389 A1 | 4/2003 | Eleveld et al. | |
| 2003/0158449 A1 | 8/2003 | Hofmann et al. | |
| 2004/0050297 A1 | 3/2004 | Kobayashi et al. | |
| 2004/0220430 A1 | 11/2004 | Eleveld et al. | |
| 2005/0065383 A1 | 3/2005 | Wehmeyer | |
| 2008/0167502 A1 | 7/2008 | Bohres et al. | |
| 2008/0171829 A1 | 7/2008 | Haider et al. | |
| 2010/0113633 A1 * | 5/2010 | Henning | C08G 77/46 556/443 |
| 2011/0294933 A1 | 12/2011 | Jaunky et al. | |
| 2011/0301254 A1 | 12/2011 | Knott et al. | |
| 2014/0221549 A1 | 8/2014 | Webster et al. | |

FOREIGN PATENT DOCUMENTS

| | | |
|---|---|---|
| CN | 103665385 A | 3/2014 |
| DE | 102014212291 A1 | 12/2015 |
| EP | 0312265 A2 | 4/1989 |
| EP | 0894108 B1 | 7/2001 |
| JP | 2000327785 A | 11/2000 |
| JP | 2007056052 A | 3/2007 |
| JP | 2011231073 A | 11/2011 |
| WO | 2010074297 A1 | 7/2010 |
| WO | 2012136657 A1 | 10/2012 |
| WO | WO 2019/206739 | * 10/2019 |

OTHER PUBLICATIONS

International Search Report for International PCT Patent Application No. PCT/EP2019/081898 dated Jan. 20, 2020.
International Search Report for International PCT Patent Application No. PCT/EP2019/081900 dated Jan. 20, 2020.

* cited by examiner

*Primary Examiner* — Marc S Zimmer

(74) *Attorney, Agent, or Firm* — James E. Piotrowski

(57) ABSTRACT

The present invention relates a hydroxyl-functionalized unimodal polysiloxane polyalkyleneglycol brush copolymer of the structure [A(-X—B)]$_s$, wherein: A represents said polysiloxane backbone; B represents said polyalkyleneglycol side chain; X is a linker group characterized by including the moiety Si—C—C— of which said Si is a part of the polysiloxane backbone A; and s is an integer of from 1 to 100, wherein the polysiloxane backbone A contains less than 500 ppm mol % of SiH moiety based on the total moles of the silicon atom which constitutes the polysiloxane backbone, and said copolymer has a polydispersity index of from 1.3 to 5.0; and a method for producing said hydroxyl-functionalized unimodal polysiloxane polyalkyleneglycol brush copolymer.

14 Claims, 3 Drawing Sheets

PREPARATION OF POLYSILOXANE POLYALKYLENEGLYCOL BRUSH COPOLYMERS

The present invention relates to hydroxyl-functionalized unimodal polysiloxane polyalkyleneglycol brush copolymers having substantially no SiH moiety and a process for the preparation thereof in the presence of a catalyst. The invention gives defined and substantially full-converted products with a controllable molar mass and without any by-products or side reactions.

A number of classes of polysiloxane polyalkyleneglycol copolymers are known in technical literature. The combination of both polymers in one copolymer can be used in formulations for surfactants, adhesives or sealants. Depending on their relative proportions in the copolymers, their properties can be combined and varied.

The preparation of polysiloxane polyalkyleneglycol copolymers can be done by various methods. Block copolymers can be formed by reaction of difunctionally terminated siloxane oligomers with mono- or difunctionally terminated alkyleneglycol monomers or oligomers. Such techniques are reported in U.S. Pat. No. 3,723,491. Most often hydrolysis, hydrosilylation or alkylation reactions are used. The formed copolymers are $AB_y$ or ABA linear block copolymers.

By switching functional end-groups to side-groups attached to the polymer main backbone, polysiloxane polyalkyleneglycol brush copolymers can be obtained. However, the copolymerization of side-groups has much more difficulties than that of end-groups. For example, conversion, reaction speed, polydispersity or viscosity depend on the steric hindrance that occurs from nearby located side-groups. Therefore, it has been nontrivial to transfer an end-group copolymerization to a side-group polymerization.

The "grafting onto" method is a technique to link oligomers or polymers together. The grafting techniques are known in N. Hadjichristidis, graft copolymers, *Encyclopedia of Polymer Science and Technology*, John Wiley & Sons, 2002. Therefor the polymer main backbone and the polymeric side-chains are already prepared and connected in the final step. A common method is the hydrosilylation reaction of a polysiloxane containing SiH groups and a vinyl group of an alkyleneglycol oligomer or polymer. The different polymer chains are linked to each other by C—C bonds. The molecular mass is limited to the molecular mass of the starting materials. Such techniques are reported in US2008/0171829 A1, JP2011231073 A, JP2000327785 A, CN103665385 A, and B. Marciniec, Hydrosilylation, Vol. 1, Springer Netherlands, 2009.

Although hydrosilylation is a well-known reaction pathway, it brings some disadvantages along with brush copolymers. In terms of size it is less likely that a comparatively small reactive side group in a polymeric starting material gets in contact with another functional group to form a polymeric network. The result is a mixture of the desired product, half reacted products, unreacted C=C double bonds and SiH groups, as well as side reactions of the OH-functional end groups. Therefore, the molecular mass cannot be controlled well. Furthermore, there is no option to change the chain length of the side-chains in the described ways.

Another way of "grafting onto" to form polysiloxane polyalkyleneglycol brush copolymers is described in US 2014/0221549 A1. The polymeric polyether side chains are linked to a polysiloxane backbone through a thioether linkage. The use of polymeric monothiol reactants brings the problem of a strong odor. In addition, the described reaction pathway to synthesize the desired product with a thioether linkage requires an expensive multistage reaction with at least five steps.

Therefore, a need still exists to overcome at least some of drawbacks of known systems.

It is an object of the present invention to provide hydroxy-functionalized unimodal polysiloxane polyalkyleneglycol brush copolymers with a controllable degree of polymerization of side chains and a polydispersity of from 1.3 to 5.0. The content of SiH moiety in polysiloxane backbone is less than 500 ppm mol % based on the total moles of the silicon atom which constitutes the polysiloxane backbone.

The object is achieved in the present invention by providing hydroxy-functionalized polysiloxane polyalkyleneglycol brush copolymers obtained by "grafting from" copolymerization method.

In accordance with a first aspect of the present invention therefore relates to a hydroxyl-functionalized unimodal polysiloxane polyalkyleneglycol brush copolymer of the structure $[A(-X—B)]_s$,
wherein:
 A represents said polysiloxane backbone;
 B represents said polyalkyleneglycol side chain;
 X is a linker group characterized by including the moiety Si—C—C— of which said Si is a part of the polysiloxane backbone A; and
 s is an integer of from 1 to 100,
 wherein the polysiloxane backbone A contains less than 500 ppm mol % of SiH moiety based on the total moles of the silicon atom which constitutes the polysiloxane backbone, and
 said copolymer has a polydispersity index of from 1.3 to 5.0.

In accordance with a second aspect of the present invention there is provided a method for producing a polysiloxane polyalkyleneglycol brush copolymer as defined above and in the appended claims.

As used herein, the singular forms "a", "an" and "the" include plural referents unless the context clearly dictates otherwise.

The terms "comprising" and "comprises" as used herein are synonymous with "including", "includes", "containing" or "contains", and are inclusive or open-ended and do not exclude additional, non-recited members, elements or method steps.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The words "preferred" and "preferably" are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

As used herein, room temperature is 23° C. plus or minus 2° C.

The molecular weights given in the present text refer to number average molecular weights (Mn), unless otherwise stipulated. All molecular weight data refer to values obtained by gel permeation chromatography (GPC) carried out using HP1090 II Chromatography with DAD detector (HEWLETT PACKARD) at 40° C. Tetrahydrofuran (THF) was used as an eluent. THF was passed through three PSS SDV gel columns with molecular weight ranges of 102, 103 and 104 g·mol$^{-1}$ with a flow rate of 0.9 ml·min$^{-1}$. The calibration of the device was carried out using polystyrene standards.

As used herein, "polydispersity index" refers to a measure of the distribution of molecular mass in a given polymer sample. The polydispersity index is calculated by dividing the weight average molecular weight (Mw) by the number average molecular weight (Mn).

As used herein, "unimodal" refers to a molecular mass distribution which has a single unique mode, which is the term for a unimodal distribution and refers to a distribution having a single local maximum, sometimes referred to as "peak".

For convenience in the description of the process of this invention, unsaturation provided by $CH_2=CH-CH_2-$ terminal group is referred to as "allyl" unsaturation.

As used herein, "$C_1$-$C_8$ alkyl" group refers to a monovalent group that contains 1 to 8 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide and hydroxy. The halogenated derivatives of the exemplary hydrocarbon radicals listed above might, in particular, be mentioned as examples of suitable substituted alkyl groups. In general, however, a preference for unsubstituted alkyl groups containing from 1-6 carbon atoms ($C_1$-$C_6$ alkyl)—for example unsubstituted alkyl groups containing from 1 to 4 carbon atoms ($C_1$-$C_4$ alkyl)—should be noted.

The term "$C_3$-$C_{10}$ cycloalkyl" is understood to mean a saturated, mono-, bi- or tricyclic hydrocarbon group having from 3 to 10 carbon atoms. Examples of cycloalkyl groups include: cyclopropyl; cyclobutyl; cyclopentyl; cyclohexyl; cycloheptyl; cyclooctyl; adamantane; and, norbornane.

As used herein, an "$C_6$-$C_{18}$ aryl" group used alone or as part of a larger moiety—as in "aralkyl group"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; indenyl; naphthalenyl; tetrahydronaphthyl, tetrahydroindenyl; tetrahydroanthracenyl; and, anthracenyl. And a preference for phenyl groups may be noted.

As used herein, an "aralkyl" group refers to an alkyl group that is substituted with an aryl group. An example of an aralkyl group is benzyl.

The terms "$C_1$-$C_{60}$ alkylene group" and "$C_1$-$C_{20}$ alkylene group" refer respectively to divalent groups that contain from 1 to 60 or from 1 to 20 carbon atoms, that are radicals of an alkane and include linear, branched organic or cyclic groups, which groups may contain at least one heteroatom, e.g., which may be substituted or substituted and may optionally be interrupted by at least one heteroatom.

As used herein, the term "arylene" group refers to a divalent group that is a radical of an aryl group. Suitable arylene group includes phenylene, furanylene, piperidylene, and naphthylene.

As used herein, the term "aralkylene" group refers to a divalent group that is a radical of an aralkyl group. An aralkylene can be represented by the formula —R—Ar— where R is an alkylene and Ar is an arylene, i.e., an alkylene is bonded to an arylene. Suitable aralkylene groups include xylylene and toluenylene.

Where mentioned, the expression "contain at least one heteroatom" means that the main chain or side chain of a residue comprises at least one atom that differs from carbon atom and hydrogen. More particularly the term "heteroatom" refers to nitrogen, oxygen, silicon, phosphorous, halogens, or sulfur. Oxygen (O) and nitrogen (N) may be mentioned as typical heteroatoms in the context of the present invention.

The term "polymerization conditions" means the reaction conditions necessary to combine monomers into polymers, and in the context of this invention, those conditions necessary for ring-opened alkylene oxides to combine with one another to form a polyether polymer.

As used herein, the term "ring-opening polymerization" denotes a polymerization in which a cyclic compound (monomer) is opened to form a linear polymer. Reference in this context may be made to inter alia in: i) Duda, A. et al. *Thermodynamics and Kinetics of Ring-Opening Polymerization in Handbook of Ring-Opening Polymerization*, Wiley-VCH, Weinheim, Germany, (2009) page 8; ii) Choijnowski, J. et al. *Kinetically controlled ring-opening polymerization*, J. Inorg. Organomet. Polym. (1991) 1, pages 299-323; and, iii) Nuyken et al. *Ring-Opening Polymerization—An Introductory Review* Polymers 2013, 5, 361-403.

As used herein, the term "catalytic amount" means a sub-stoichiometric amount of catalyst relative to a reactant.

The term "double metal cyanide (DMC) compound" is used in accordance with its standard meaning as an inorganic compound compromising cyanide anions and two different metal cations. For completeness, the two metal cations differ from each other based either on the metal per se or on their oxidation numbers.

As used herein, a double metal cyanide catalyst complex comprises a double metal cyanide (DMC) compound, at least one organic complexing agent and a metal salt. That complex may be unsupported or supported on an appropriate support material.

As used herein, the term "halogen" refers to fluorine, chlorine, bromine or iodine and correspondingly the term "halide" denotes fluoride, chloride, bromide or iodide anions.

The term "anhydrous" is intended to mean herein that the applicable reaction mixture or component comprises less than 0.25 wt. % of water, based on the weight of the mixture or component. The term "essentially free of solvent" should be interpreted analogously as meaning the relevant composition comprises less than 0.25 wt. % of solvent.

In Formulas (I), (II), and (V) as defined herein, the different siloxane subunits n, n1, n2, n3, and p are not necessarily present in the order as illustrated herein. The subunits n, n1, n2, n3 and p can be randomly distributed in the polysiloxane backbone in every possible combination.

In preferred embodiments, the hydroxyl-terminated unimodal polysiloxane polyalkyleneglycol brush copolymers according to the invention is characterized in that the polysiloxane backbone A contains less than 10 ppm mol %, more preferably less than 2 ppm mol %, of SiH moiety based on the total moles of the silicon atom which constitutes the polysiloxane backbone.

In preferred embodiments, the hydroxyl-terminated unimodal polysiloxane polyalkyleneglycol brush copolymers according to the invention is characterized in that said copolymer has a polydispersity index of from 1.6 to 3.0.

The hydroxyl-terminated unimodal polysiloxane polyalkyleneglycol brush copolymers according to the invention is preferably further characterized by the number average molecular weight (Mn) of from 1000 to 200,000 g/mol, preferably from 2000 to 100,000 g/mol.

According to preferred embodiments, the hydroxyl-functionalized unimodal polysiloxane polyalkyleneglycol brush copolymer according to the invention is represented by Formula (I)

Formula (I)

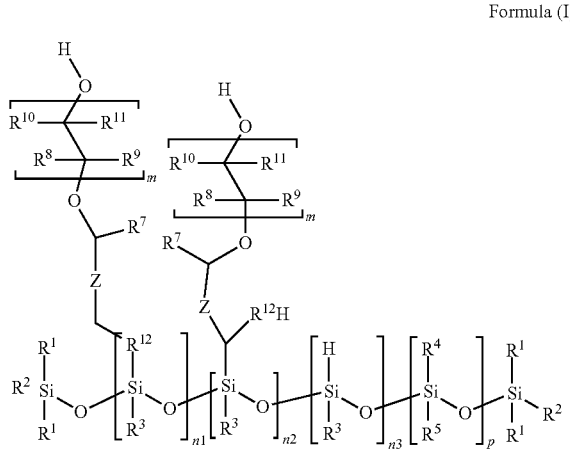

wherein:

Z is a covalent bond or selected from a polyoxyalkylene having a molecular weight of less than 10000 g/mol or a linear, branched or cyclic hydrocarbon residue having 1 to 20 carbon atoms which may contain at least one heteroatom;

$R^1$, $R^2$, $R^3$, $R^4$ and $R^5$ may be the same or different and are independently selected from a linear, branched or cyclic hydrocarbon residue having 1 to 20 carbon atoms which may contain at least one heteroatom, wherein $R^3$, $R^4$ and $R^5$ may be independently selected in each unit n1, n2, n3, and p;

$R^{12}$ is selected from a linear, branched or cyclic hydrocarbon residue having 1 to 20 carbon atoms which may contain at least one heteroatom;

$R^7$ is selected from hydrogen or a linear, branched or cyclic hydrocarbon residue having 1 to 20 carbon atoms which may contain at least one heteroatom;

$R^8$, $R^9$, $R^{10}$ and $R^{11}$ may be the same or different and in each unit m they are independently selected from hydrogen or a linear, branched or cyclic hydrocarbon residue having 1 to 20 carbon atoms which may contain at least one heteroatom;

n1 and n2 is an integer independently selected from 0 to 1000, preferably from 2 to 500, more preferably from 5 to 100, with the proviso that not both of n1 and n2 are 0;

n3 is an integer from 0 to 10, preferably from 0 to 5, more preferably from 0 to 2, most preferably from 0 to 1;

p is an integer from 0 to 1000, preferably from 1 to 500, more preferably from 5 to 100; and m is an integer from 1 to 1500, preferably from 1 to 1000.

In certain embodiments, n1 is selected from 1 to 1000 and n2 is selected from 0 to 1000, in particular n1 is 1 to 1000 and n2 is 0. Alternatively, in certain embodiments, n1 is selected from 0 to 1000, in particular 0, and n2 is selected from 1 to 1000.

The ratio of n3 to the sum of n1+n2+n3+p is selected from the ranges as defined above so that polysiloxane backbone contains less than 500 ppm mol %, preferably less than 10 ppm mol %, more preferably less than 2 ppm mol %, of SiH moiety based on the total moles of the silicon atom which constitutes the polysiloxane backbone.

In Formula (I) Z is a covalent bond or selected from a polyoxyalkylene having a molecular weight of less than 10000 g/mol or a linear, branched or cyclic hydrocarbon residue having 1 to 20 carbon atoms which may contain at least one heteroatom, preferably selected from a $C_1$-$C_{20}$ alkylene group, more preferably a $C_1$-$C_8$ alkylene group, a $C_6$-$C_{18}$ arylene group or a $C_6$-$C_{18}$ aralkylene group, which may contain at least one heteroatom, preferably selected from O, N, S, Cl, Br or F.

In more preferred embodiments, Z is selected from a $C_1$-$C_{20}$ alkylene group, in particular a $C_1$-$C_8$ alkylene group, a $C_6$-$C_{18}$ arylene group or a $C_6$-$C_{18}$ aralkylene group, which may contain at least one heteroatom, preferably selected from O, N, S, Cl, Br or F.

In particular, Z is a $C_1$-$C_{20}$ alkylene group, more preferably a $C_1$-$C_8$ alkylene group, which may contain at least one heteroatom, preferably selected from O, N, S, Cl, Br or F, in particular O. In particularly preferred embodiments, Z is a $C_1$-$C_8$ alkylene group which contains O.

In Formula (I) $R^7$ is selected from hydrogen or a linear, branched or cyclic hydrocarbon residue having 1 to 20 carbon atoms which may contain at least one heteroatom, preferably selected from a $C_1$-$C_{12}$ alkyl group, more preferably a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom, preferably selected from O, N, S, Cl, Br or F.

In more preferred embodiments, $R^7$ is selected from hydrogen or a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom, preferably selected from O, N, S, Cl, Br or F.

In most preferred embodiments, $R^7$ is selected from hydrogen or a $C_1$-$C_8$ alkyl group, in particular methyl group.

In Formula (I) $R^{12}$ is selected from a linear, branched or cyclic hydrocarbon residue having 1 to 20 carbon atoms which may contain at least one heteroatom, preferably $CR^a_2$ where each $R^a$ may be the same or different and is independently selected from hydrogen, a $C_1$-$C_{12}$ alkyl group, in particular a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom, preferably selected from O, N, S, Si, Cl, Br or F. Alternatively, both $R^a$ can form a cyclic structure which may contain at least one heteroatom.

In preferred embodiments, both $R^a$ are hydrogen.

In Formula (I), $R^1$, $R^2$, $R^3$, $R^4$ and $R^5$ may be the same or different and are independently selected from a linear, branched or cyclic hydrocarbon residue having 1 to 20 carbon atoms which may contain at least one heteroatom, preferably selected from a $C_1$-$C_{12}$ alkyl group, more preferably a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom, preferably O, N, S, Cl, Br or F. In particular, $R^3$, $R^4$ and $R^5$ may be independently selected in each siloxane unit, i.e., unit n1, n2, n3, and p.

In more preferred embodiments, $R^1$, $R^2$, $R^3$, $R^4$ and $R^5$ may be the same or different and are independently selected from a $C_1$-$C_8$ alkyl group, more preferably a $C_1$-$C_4$ alkyl group, which may contain at least one heteroatom, preferably O, N, S, Cl, Br or F, in particular methyl, ethyl, n-propyl, fluoropropyl, n-butyl, sec-butyl, or tert-butyl, or a $C_6$-$C_{18}$ aryl group which may contain at least one heteroatom, preferably O, N, S, Cl, Br or F, in particular phenyl, tolyl or benzoyl. In most preferred embodiments, $R^1$, $R^2$, $R^3$, $R^4$ and $R^5$ are the same or different and independently selected from methyl or phenyl.

In Formula (I), each $R^8$, $R^9$, $R^{10}$ and $R^{11}$ may be the same or different and in each unit m they are independently selected from hydrogen or a linear, branched or cyclic hydrocarbon residue having 1 to 20 carbon atoms which may contain at least one heteroatom, preferably selected from a $C_1$-$C_{12}$ alkyl group, more preferably a $C_1$-$C_8$ alkyl group, a $C_3$-$C_{10}$ cycloalkyl group, a $C_6$-$C_{18}$ aryl group or a $C_6$-$C_{18}$ aralkyl group, with the proviso that at least one of $R^{10}$ and $R^{11}$ is not hydrogen and may contain at least one heteroatom, preferably selected from O, N, S or S.

It is preferred that $R^8$, $R^9$ and $R^{11}$ are hydrogen and $R^{10}$ is either a phenyl group or a $C_1$-$C_8$ alkyl group and, more preferably, a $C_1$-$C_4$ alkyl group.

The hydroxyl-functionalized polysiloxane polyalkyleneglycol brush copolymer according to the present invention is obtainable by a two-step process, the first step being a hydrosilylation reaction to form a hydroxyl-functionalized polysiloxane prepolymer and the second step being the ring-opening polymerization of at least one alkylene oxide in the presence of said hydroxyl-functionalized polysiloxane prepolymer as a starter compound.

The method for producing hydroxyl-functionalized polysiloxane polyalkyleneglycol brush copolymers according to the present invention comprises the steps of:

a) reacting a hydroxyalkyl allyl ether having a primary or secondary alcohol group with a polyhydridosiloxane under anhydrous conditions and under catalysis of a transition metal catalyst of which the transition metal is selected from Groups 8 to 10 of the Periodic Table to provide a hydroxyl-functionalized polysiloxane prepolymer having Formula (II),

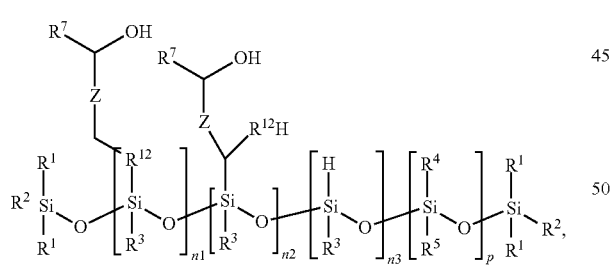

Formula (II)

wherein:
Z is a covalent bond or selected from a polyoxyalkylene having a molecular weight of less than 10000 g/mol or a linear, branched or cyclic hydrocarbon residue having 1 to 20 carbon atoms which may contain at least one heteroatom;
$R^1$, $R^2$, $R^3$, $R^4$ and $R^5$ may be the same or different and are independently selected from a linear, branched or cyclic hydrocarbon residue having 1 to 20 carbon atoms which may contain at least one heteroatom;
$R^{12}$ is selected from a linear, branched or cyclic hydrocarbon residue having 1 to 20 carbon atoms which may contain at least one heteroatom;
$R^7$ is selected from hydrogen or a linear, branched or cyclic hydrocarbon residue having 1 to 20 carbon atoms which may contain at least one heteroatom;
n1 and n2 is an integer independently selected from 0 to 1000, preferably from 2 to 500, more preferably from 5 to 100, with the proviso that not both of n1 and n2 are 0;
n3 is an integer from 0 to 10, preferably from 0 to 5, more preferably from 0 to 2, most preferably from 0 or 1; and
p is an integer from 0 to 1000, preferably from 1 to 500, more preferably from 5 to 100,
said hydroxyalkyl allyl ether conforming to Formula (IV), and

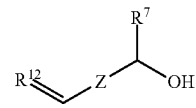

Formula (IV)

wherein Z, $R^{12}$ and $R^7$ are as defined above,
said polyhydridosiloxane conforming to Formula (V)

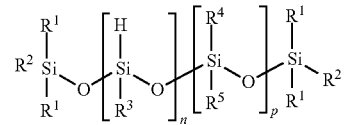

Formula (V)

wherein:
$R^1$, $R^2$, $R^3$, $R^4$, $R^5$ and p are as defined above; and
n is n1+n2+n3, and b) in the presence of the obtained hydroxyl-functionalized polysiloxane prepolymer of Formula (II) and a catalyst, performing a ring-opening polymerization of at least one alkylene oxide monomer having Formula (III):

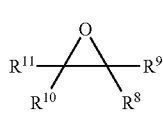

Formula (III)

wherein:
each $R^8$, $R^9$, $R^{10}$ and $R^{11}$ may be the same or different and are independently selected from hydrogen or a linear, branched or cyclic hydrocarbon residue having 1 to 20 carbon atoms which may contain at least one heteroatom.

The preferred embodiments with regard to $R^1$, $R^2$, $R^3$, $R^4$, $R^5$, $R^7$, $R^8$, $R^9$, $R^{10}$, $R^{11}$, Z, n1, n2, n3, p and m are as defined above.

In preferred embodiments, in step a) the SiH groups are substantially completely hydrosilylated to form hydroxyl-functionalized side groups, which are alkoxylated in the second reaction step b). The hydroxyl-functionalized polysiloxane prepolymer contains less than 500 ppm mol %, preferably less than 10 ppm mol %, more preferably less than 2 ppm mol %, of SiH moiety based on the total moles of the silicon atom which constitutes the polysiloxane backbone.

In step a), by reacting a hydroxyalkyl allyl ether of Formula (IV) with a polyhydridosiloxane of Formula (V), hydroxyl-functionalized polysiloxane prepolymers of Formula (II) having a linear adduct represented by the siloxane subunit n1 and/or a branched adduct represented by the siloxane subunit n2 can be created. In the linear adduct, the SiH moiety is converted to Si—$R^{12}$—$CH_2$—Z—$(R^7)$OH, while in the branched adduct, the SiH moiety is converted to Si—CH($R^{12}$H)—Z—$(R^7)$OH. The linear adduct and the branched adduct can be randomly distributed in the siloxane backbone, with the ratio of n1 to n2 depending on the catalyst used.

The polyhydridosiloxane of Formula (V) contains —Si$(R_4)(R_5)$O— units, e.g., dimethylsiloxane units, in the backbone. The ratio between —Si(H)$(R_3)$O— units and —Si$(R_4)$$(R_5)$O— units can be varied.

Importantly, the above hydrosilylation reaction is performed under anhydrous conditions and under catalysis, wherein the catalyst used is a transition metal catalyst of which the transition metal is selected from Groups 8 to 10 of the Periodic Table (https://iupac.org/what-we-do/periodic-table-of-elements/) and more usually from the group consisting of ruthenium, rhodium, palladium, osmium, iridium, platinum and combinations thereof.

As illustrative but non-limiting examples of such catalysts may be mentioned: platinum catalysts, such as platinum black powder, platinum supported on silica powder, platinum supported on alumina powder, platinum supported on carbon powder (e.g., activated carbon), chloroplatinic acid, 1,3-divinyltetramethyldisiloxane complexes of platinum, carbonyl complexes of platinum and olefin complexes of platinum; palladium catalysts, such as palladium supported on silica powder, palladium supported on alumina powder, palladium supported on carbon powder (e.g., activated carbon), carbonyl complexes of palladium and olefin complexes of palladium; ruthenium catalysts, such as $RhCl_3$ $(Bu_2S)_3$, ruthenium 1,3-ketoenolate and ruthenium carbonyl compounds such as ruthenium 1,1,1-trifluoroacetylacetonate, ruthenium acetylacetonate and triruthinium dodecacarbonyl; and, rhodium catalysts, such as rhodium supported on silica powder, rhodium supported on alumina powder, rhodium supported on carbon powder (e.g., activated carbon), carbonyl complexes of rhodium and olefin complexes of rhodium. Preferred catalysts take the form of said transition metals supported on a powder such as alumina, silica, or carbon; platinum supported on carbon powder is particularly preferred for use as the catalyst in the present method.

Without intention to limit the catalytic amount of the transition metal catalysts used in synthesis step a) i) of this embodiment, typically the catalyst is used in an amount that provides from 0.0001 to 1 gram of catalytic metal per equivalent of silicon-bonded hydrogen in the siloxane.

The progress of the reaction and, in particular, the consumption of the unsaturated group of the hydroxyalkyl allyl ether can be monitored by known methods. This aside, the reaction generally requires a time of 0.03 to 72 hours to reach completion, more commonly from 0.25 to 30 or 0.25 to 16 hours.

Upon completion of the reaction, it is facile to remove any solid, suspended compounds by, for example, filtration, crossflow filtration or centrifugation. Further, the reaction product may be worked up, using methods known in the art, to isolate and purify the product. For example, any solvent present may be removed by stripping at reduced pressure.

In the step b), the "grafting from" polymerization of at least one alkylene oxide monomer onto a polysiloxane backbone in the presence of a catalyst, preferably DMC catalyst, as define herein.

Exemplary alkylene oxides used in step b) are: ethylene oxide, 1,2-propylene oxide, epichlorohydrin, 1,2-butylene oxide, 1,2-pentylene oxide, isopentylene oxide, 1,2-hexylene oxide, 1,2-heptylene oxide, styrene oxide, cyclohexene oxide, methylglycidyl ether, ethylglycidyl ether, allylglycidyl ether, phenylglycidyl ether, butadiene monooxide, isoprene monooxide, tolylglycidyl ether, cyclohexene oxide, cyclooctane epoxide, cyclododecane epoxide, (+)-cis-limonene oxide, (+)-cis, trans-limonene oxide and (−)-cis, trans-limonene oxide; preferred for this invention are ethylene oxide, 1,2-propylene oxide, commonly referred simply as propylene oxide, 1,2-butylene oxide, 2,3-butylene oxide, styrene oxide and cyclohexene oxide. Particular preference is given to using propylene oxide.

In case more than one alkylene oxide monomer are used, each $R^8$, $R^9$, $R^{10}$ and $R^{11}$ may be independently selected. In such a case, each $R^8$, $R^9$, $R^{10}$ and $R^{11}$ in Formula (I) are independently selected in each unit m.

Suitable catalysts, which may be used individually or in admixture, include: alkali metal hydroxides such as KOH, NaOH and CsOH; alkaline earth metal hydroxides, such as $Ca(OH)_2$ and $Sr(OH)_2$; alkali metal alkoxides, such as KOMe, NaOMe, KOt-Bu and NaOt-Bu; alkali earth metal alkoxides, such as $Ca(OMe)_2$ and $Sr(OMe)_2$; and double metal cyanide catalyst.

The catalysts can typically be employed in an amount of from 0.05 to 0.5 wt. %, based on the total weight of the reactants and can be used either as solids, solutions or suspensions. It is also possible to add only part of the catalyst at the beginning of the reaction and introduce further catalysts in one or more portions at a later point in time; the later added fraction of catalyst may be identical or different to the initial catalyst and the amount of solvent present at each addition of catalyst can be moderated to ensure the efficacy of catalyst.

In preferred embodiments the reaction in step b) is catalyzed by a double metal cyanide (DMC) catalyst. Double metal cyanide catalyst complexes and the methods by which such complexes may be prepared are known in the art. The attention of the reader may, for example, be directed to: US 2008/0167502 (BASF); US 2003/0158449 (Bayer); US 2003/0069389 (Shell); US 2004/0220430 (Repsol Quimica); US 2005/0065383 (Dow); WO2012/136657 A1 (Henkel AG & Co. KGaA); EP0894108 (Arco); U.S. Pat. No. 5,767,323 (Yiannakis et al.); and, U.S. Pat. No. 5,536,883 (Arco).

The amount of DMC catalyst required for the synthesis of the hydroxyl-functionalized polysiloxane polyalkyleneglycol brush copolymer according to the present invention is preferably in the range of 10 to 5000 ppm, most preferably between 50 to 500 ppm, based on the weight of the final product.

The polymerization reaction can be carried out in a semi-batch mode where the hydroxyalkyl-functionalized polysiloxane prepolymer of Formula (II) and the catalytic amount of the catalyst, preferably DMC catalyst, are charged in the reactor and pre-heated under vacuum to eliminate adventitious water. A portion of the alkylene oxide of Formula (III) is fed into the reactor at the desired temperature. The activation of the catalyst is noted by the sudden pressure decrease after which the rest of the alkylene oxide is continuously added at a certain rate until the required amount of monomer necessary to achieve the desired molecular weight of product is inside the reactor. The reaction temperature for this procedure can range between 0 and 300° C., being specially desired between 60 and 240° C.

If desired, the oxyalkylation may be carried out in a suitable solvent, such as an aromatic hydrocarbon—illustratively toluene or benzene—or, alternatively, an aliphatic hydrocarbon solvent having from 5 to 12 carbon atoms, such as heptane, hexane or octane. Where solvents are used, aliphatic solvents are preferred in order to obviate the potential toxic associations connected with use of aromatic hydrocarbon solvents.

By virtue of the "grafting from" polymerization, the second reaction step b) offers the opportunity to have a complete control of the number of alkoxylated side-chains in the polysiloxane backbone, as well as the complete control of degree of polymerization of polyether side chains. In addition to that, low molecular weight by-products can be avoided. The synthetic pathway according to the present invention is selective towards the obtained product without any side reactions and a substantially full conversion of SiH groups is attained. The degree of polymerization of the side-chains can be calculated and controlled with the amount of alkylene oxide used. Thus, a complete control of the desired molecular mass is possible with low polydispersity. The calculated molecular masses are in good agreement with those measured experimentally. Furthermore, the presented invention gives the opportunity to vary molecular masses after the reaction is finished due to the fact that the end groups of the side-chains can be activated again. Thus, the chain lengths of side-chains can be increased on demand.

The yield of the provided procedure is higher than 90%, preferably higher than 95% and most preferably higher than 99%, calculated by subtracting the wt. % of the residual monomer after the synthesis.

Various features and embodiments of the disclosure are described in the following examples, which are intended to be representative and not limiting. The following examples serve to explain the invention, but the invention is not limited thereto.

EXAMPLES

Example 1

Preparation of 1-(allyloxy)propan-2-ol

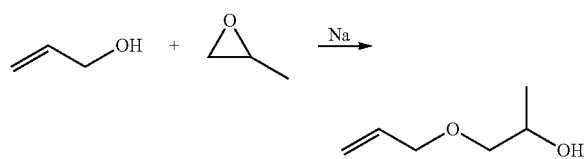

Figure 1:
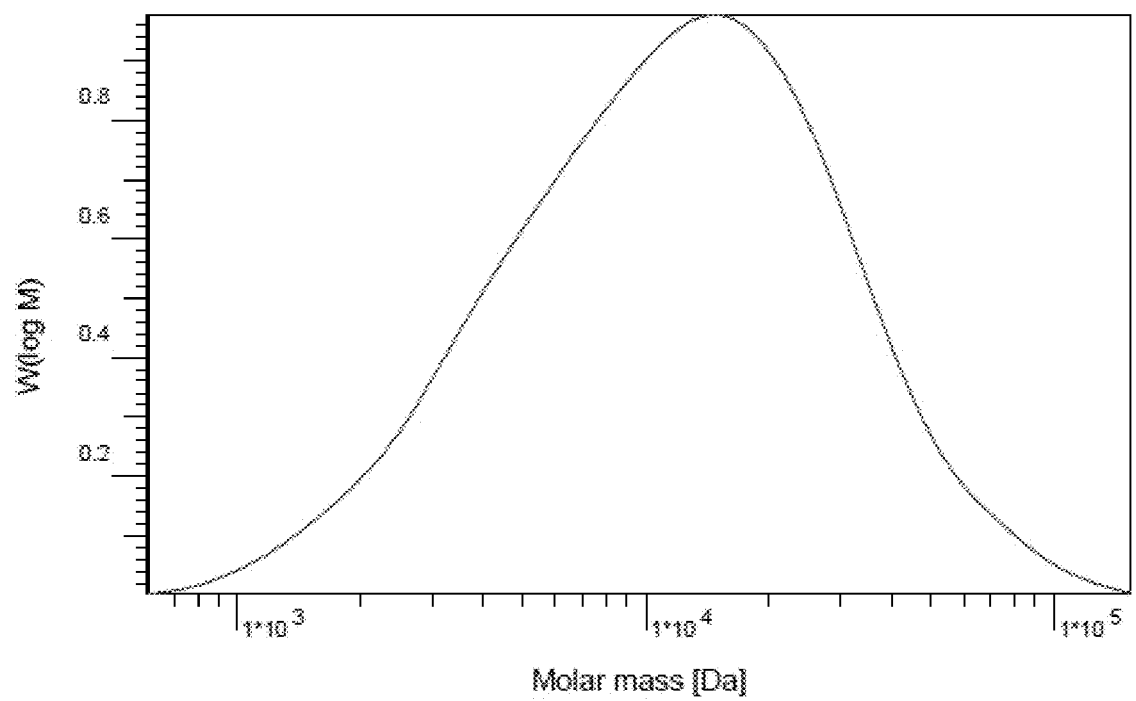
FIG. 1 shows the GPC curve of Example 3.
Figure 2:
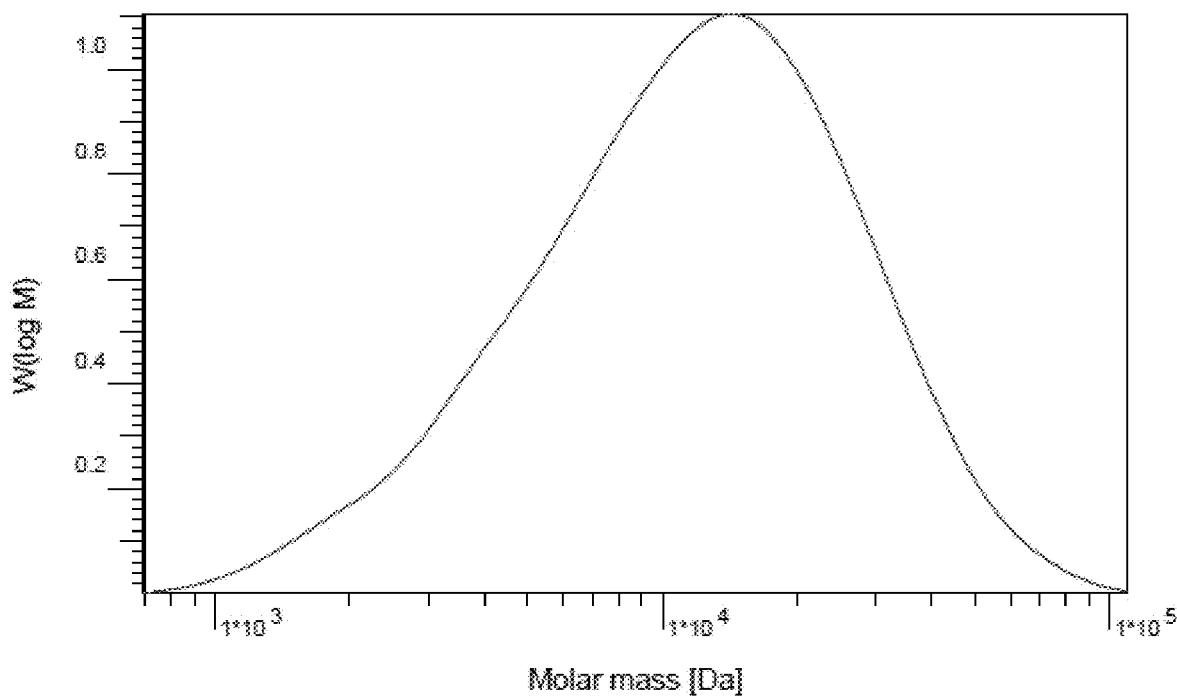
FIG. 2 shows the GPC curve of Example 4.
Figure 3:
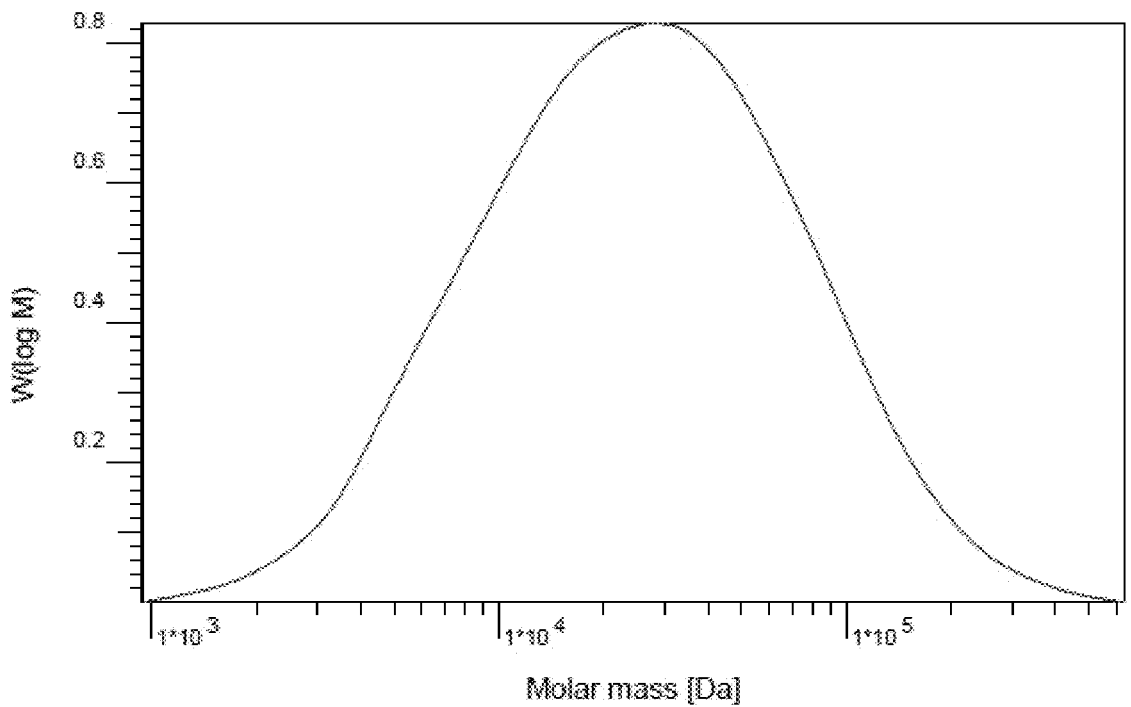
FIG. 3 shows the GPC curve of Example 5.
Figure 4:
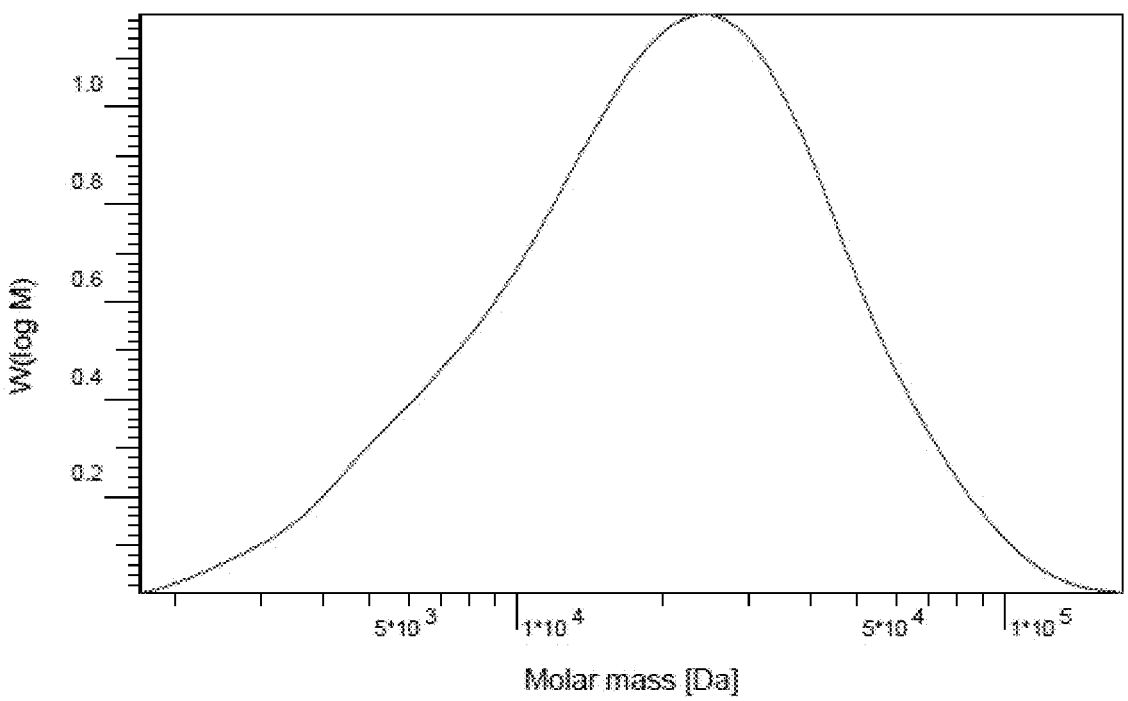
FIG. 4 shows the GPC curve of Example 6.
Figure 5:
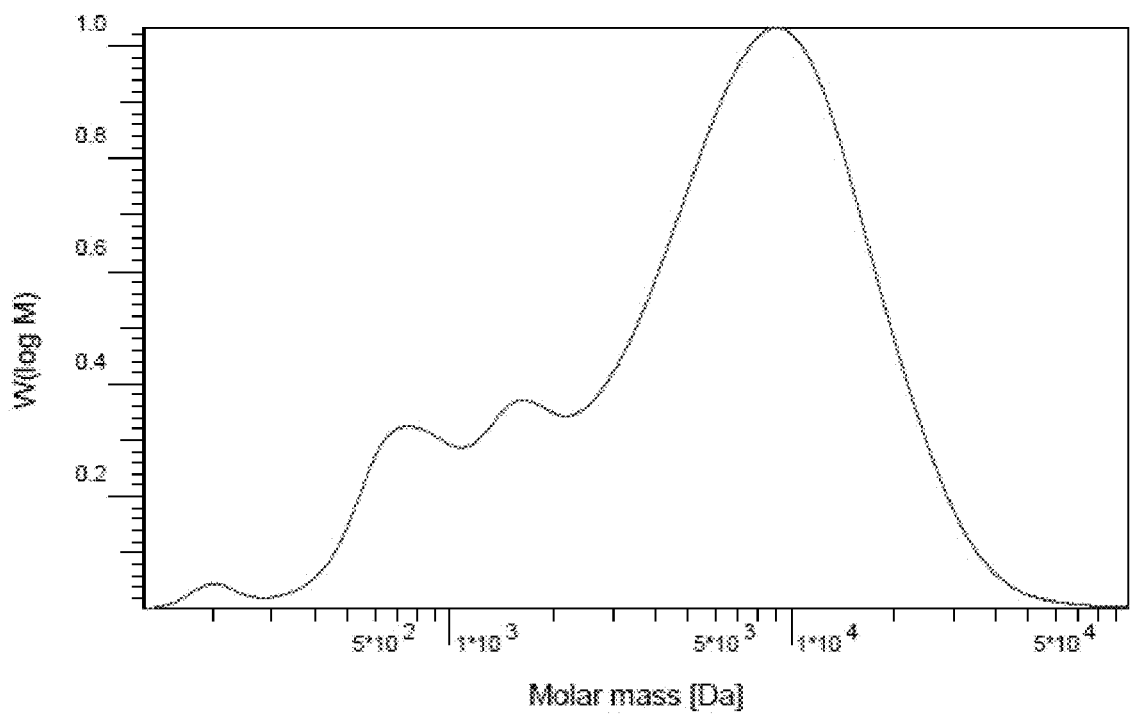
FIG. 5 shows the GPC curve of Comparative Example 7.
Figure 6:
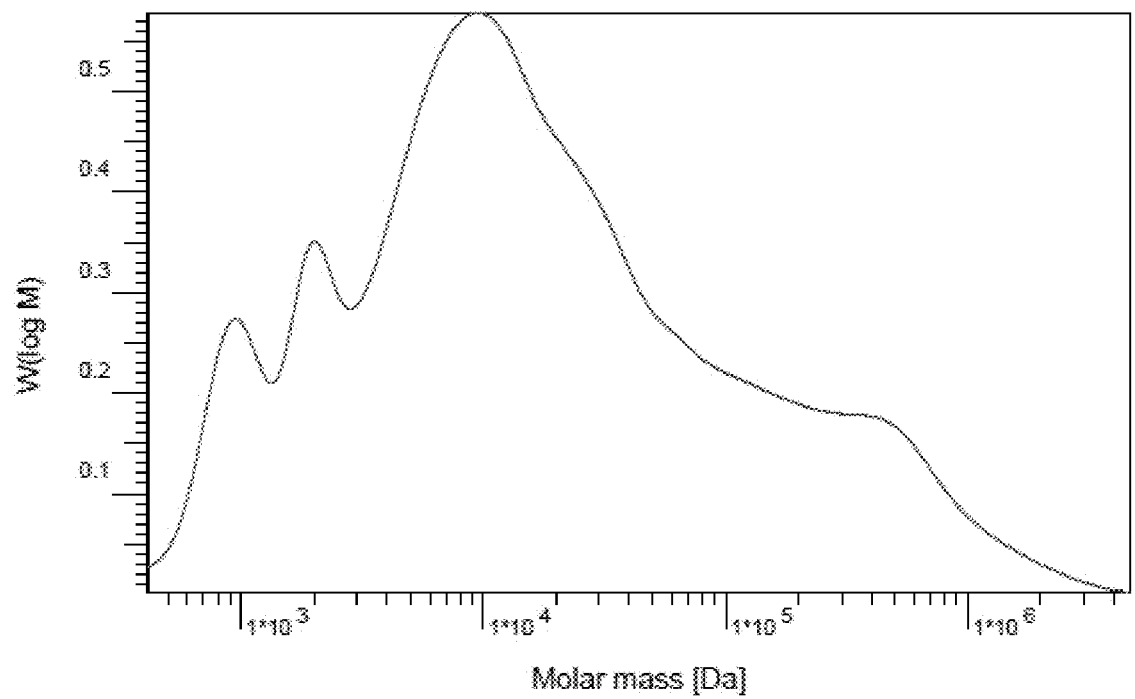
FIG. 6 shows the GPC curve of Comparative Example 8.

In a 1 L autoclave equipped with dosage system, 637.5 g (10.98 mol) of allyl alcohol were placed. Under argon flow, Na (2.9% mol) was added into the vessel. The mixture was stirred at room temperature until the gas evolution ceased. Then the autoclave was closed and heated until 110° C. In the next step propylene oxide (PO) was dosed (520 ml, dosage rate 1.25 g/min). After the completion of the addition of PO it was allowed to cool to room temperature and the reaction mixture was stirred overnight. A yellow transparent mixture was obtained. The mixture was neutralized using HCl (solution 37% in water) and dried with $Na_2SO_4$. The mixture was filtrated trough celite and distilled under vacuum (100 mbar, 85-95° C.). The product was obtained with good yield (70-75%) and the structure was confirmed by NMR spectroscopy and mass spectrometry.

Example 2

Preparation of (3-(2-hydroxypropoxy)propyl)methylsiloxane-co-polydimethylsiloxane

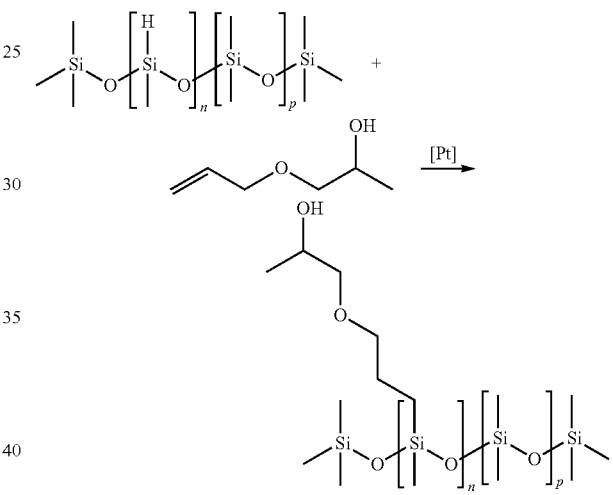

A 250 ml three neck round bottomed flask was degassed under high vacuum ($1^{-3}$ mbar) and flushed with argon. Then, 110 µL of Karstedt (2% of Pt in the catalyst, 0.1% mol in the mixture) and toluene (50 ml, dried over molecular sieves) were added into the flask under argon atmosphere and stirred at room temperature (20° C.) for a couple of minutes. Then 1-(allyloxy)propan-2-ol (the product from example 1; 3.8 ml) was added into the system. Polyhydridomethylsiloxane-co-polydimethylsiloxane (12.5 g, Mn 2900 g/mol) were added dropwise. The mixture was stirred and refluxed (oil bath temperature: 120° C.) under inert atmosphere (Ar) until complete conversion of the SiH groups was achieved (the reaction was followed by $^1$H-NMR). The mixture (when necessary) was decolorized by adding activated carbon and an excess of pentane and stirred for 16 h at room temperature. The crude was filtrated trough celite, and the solvents and volatiles were evaporated under vacuum. The obtained product (yield 85-95%) was a colorless, transparent viscous liquid. The molecular weight and structure of the product was confirmed by GPC and NMR spectroscopy. No traces of Pt were detectable in the mixture (by ICP).

Example 3

Preparation of Polydimethylsiloxane-graft-poly(propylene oxide)

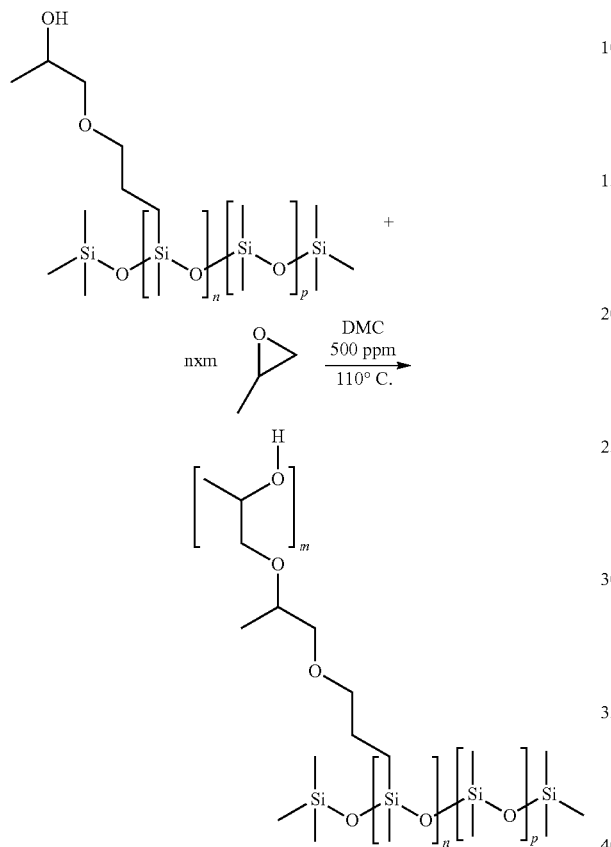

5.0 g of (3-(2-hydroxypropoxy)propyl)m ethylsiloxane-co-polydimethylsiloxane (from example 3 Mn: 3596 g/mol) were charged together with 0.015 g of the DMC catalyst (500 ppm based on the amount of the copolymer) and 20.0 g heptane in a 100 mL—stirring Autoclave. The reaction mixture was stirred at room temperature with constant stirring at 350 rpm for several minutes under vacuum (0.001 bar) and argon atmosphere (1 bar). Then the reaction temperature was increased at 110° C. After reaching this temperature, 3.5 mL propylene oxide (PO) were added to the reaction mixture and stirred constantly at 350 rpm. After filtration (when necessary) the solvent and traces of unreacted monomer were removed under vacuum (0.001 bar) for three hours. The yield of the product was found to be 90%. The product is milky, colorless, viscos liquid.

Example 4

Preparation of Polydimethylsiloxane-graft-poly(propylene oxide)

The procedure is the same as shown in Example 3. The volume of added PO is 7.0 mL.

Example 5

Preparation of Polydimethylsiloxane-graft-poly(propylene oxide)

The procedure is the same as shown in Example 3. The volume of added PO is 10.5 mL.

Example 6

Preparation of Polydimethylsiloxane-graft-poly(propylene oxide)

The procedure is the same as shown in Example 3. The volume of added PO is 14.0 mL.

Comparative Example 7 (Adapted from High Performance Polymers (2005), 17(2), 303-312)

This comparative example is used to describe the advantage of the presented invention compared to the known grafting onto copolymerization. The desired product should give the identical product as it is shown in Example 4.

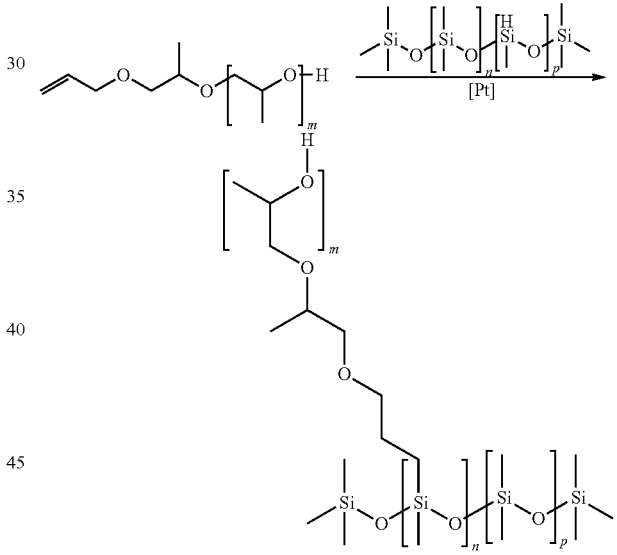

A 50 ml three neck round bottomed flask fitted with a cooling condenser was degassed under high vacuum ($1^{-3}$ mbar) and flushed with argon. Polyhydridomethylsiloxane-co-polydimethylsiloxane (5.0 g, Mn 2900 g/mol) and 5 mL dried Toluene were introduced into it and heated up to 90° C. 0.05 mL solution 2% $H_2PtCl_6$ in anhydrous isopropanol was added. 8.4 g propoxylated 1-(allyloxy)propan-2-ol (Mn 813 g/mol) and and 5 mL dried Toluene were added to the mixture. The reaction was stirred at 130° C. after completion of addition for 24 hours. Then, the toluene was removed by heating the reaction mixture under vacuum and the crude copolymer was obtained.

The crude product was diluted in pentane and methanol and then dried under vacuum again. The obtained product (yield 90%) was a slightly milky, brown, viscous liquid. The molecular weight and structure of the product was confirmed by GPC and NMR spectroscopy.

Comparative Example 8 (Adapted from JP2011231073 A)

This comparative example is used to describe the advantage of the presented invention compared to the known grafting onto copolymerization. The desired product should give the identical product as it is shown in Example 4.

A 50 ml three neck round bottomed flask fitted with a cooling condenser was degassed under high vacuum ($1^{-3}$ mbar) and flushed with argon. Polyhydridomethylsiloxane-co-polydimethylsiloxane (5.0 g, Mn 2900 g/mol) and 5 mL dried Toluene were introduced into it and heated up to 70° C. 8.4 g propoxylated 1-(allyloxy)propan-2-ol (Mn 813 g/mol) and 0.04 g of Karstedt (2% of Pt in the catalyst) were added dropwise at 70° C. while stirring under argon. The reaction was continued at 100° C. after completion of addition. The mixture was stirred and refluxed (oil bath temperature: 100° C.) under inert atmosphere (Ar) for 24 hours. The crude was (if necessary) filtrated, and the solvents and volatiles were evaporated under vacuum. The obtained product (yield 65%) was a brown, transparent viscous liquid. The molecular weight and structure of the product was confirmed by GPC and NMR spectroscopy.

Methods:
NMR-Spectroscopy:

All NMR measurements were done on a Bruker 600 MHz instrument. The NMR measurements are quantitative $^1$H-NMR (D1=30 s) with deuterated chloroform as solvent and naphthalene (0.00770848 mmol) as external standard. All the samples were measured at room temperature (297 K). The chemical shifts are given in ppm. The calibration of the chemical shifts in 1H spectra was carried out by using the shifts of the deuterated solvents (CDCl3; δH 7.26).

GPC:

Gel permeation chromatography was carried out using HP1090 II Chromatography with DAD detector (HEW-LETT PACKARD) at 40° C. Tetrahydrofuran (THF) was used as an eluent. THF was passed through three PSS SDV gel columns with molecular weight ranges of 102, 103 and 104 g·mol-1 with a flow rate of 0.9 ml·min-1. The calibration of the device was carried out using polystyrene standards. Table 1 shows the reaction conditions of Examples 3 to 6.

TABLE 1

Examples 3 to 6 with different amounts of propylene oxide (PO)

| | Starter | Solvent | DMC catalyst | PO | Degree of polymerization | Molecular weight | Polydispersity |
|---|---|---|---|---|---|---|---|
| Ex. 3 | 5 g | 20 g | 15 mg | 3.5 mL | 6 | 5684 g/mol | 2.02 |
| Ex. 4 | 5 g | 20 g | 15 mg | 7.0 mL | 12 | 7424 g/mol | 2.32 |
| Ex. 5 | 5 g | 20 g | 15 mg | 10.5 mL | 18 | 10208 g/mol | 2.89 |
| Ex. 6 | 5 g | 20 g | 15 mg | 14.0 mL | 23 | 11948 g/mol | 1.85 |

The molecular weight was calculated by $^1$H-NMR and the polydispersity was measured by GPC.

Table 2 shows that a full conversion was not achieved in Comparative Examples 7 and 8, whereas a substantially full conversion was achieved in Example 4. The percentages were calculated by the integration of $^1$H-NMR spectroscopy and the external standard naphthalene.

TABLE 2

| | Content of unreacted SiH moiety | Degree of polymerization | Molecular weight | Polydispersity |
|---|---|---|---|---|
| Ex. 4 | 17 ppm mol % | 12 | 7347 g/mol | 2.02 |
| Comparative Ex. 7 | 655 ppm mol % | 12 | 2571 g/mol | 3.29 |
| Comparative Ex. 8 | 621 ppm mol % | 12 | 4665 g/mol | 22.63 |

The invention claimed is:

1. A hydroxyl-functionalized unimodal polysiloxane polyalkyleneglycol brush copolymer, wherein the copolymer is represented by Formula (I)

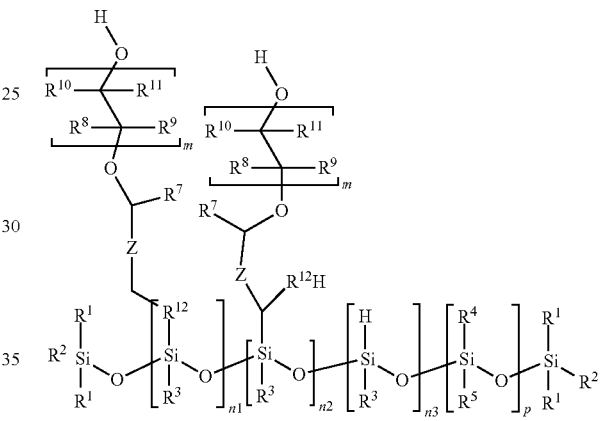

Formula (I)

wherein:

Z is a covalent bond or selected from a polyoxyalkylene having a molecular weight of less than 10000 g/mol or a linear, branched or cyclic hydrocarbon residue having 1 to 20 carbon atoms which may contain at least one heteroatom;

$R^1$, $R^2$, $R^3$, $R^4$ and $R^5$ may be the same or different and are independently selected from a linear, branched or cyclic hydrocarbon residue having 1 to 20 carbon atoms which may contain one or more heteroatoms, wherein each $R^3$, $R^4$ and $R^5$ may be independently selected within each unit n1, n2, n3, and p;

$R^{12}$ is selected from a linear, branched or cyclic hydrocarbon residue having 1 to 20 carbon atoms which may contain one or more heteroatoms;

$R^7$ is selected from a linear, branched or cyclic hydrocarbon residue having 1 to 20 carbon atoms which may contain one or more heteroatoms;

$R^8$, $R^9$, $R^{19}$ and $R^{11}$ may be the same or different and within each unit m they are independently selected from hydrogen or a linear, branched or cyclic hydrocarbon residue having 1 to 20 carbon atoms which may contain one or more heteroatoms;

n1 and n2 is an integer independently selected from 0 to 1000, with the proviso that not both of n1 and n2 are 0;

n3 is an integer from 0 to 10;

p is an integer from 0 to 1000; and m is an integer from 1 to 1500.

2. The hydroxyl-functionalized unimodal polysiloxane polyalkyleneglycol brush copolymer according to claim 1, wherein:
the polysiloxane backbone A contains less than 500 ppm mol % of SiH moiety based on the total moles of the silicon atom which constitutes the polysiloxane backbone, and
said copolymer has a polydispersity index of from 1.3 to 5.0.

3. The hydroxyl-functionalized unimodal polysiloxane polyalkyleneglycol brush copolymer according to claim 1, wherein the polysiloxane backbone A contains less than 10 ppm mol % of SiH moiety based on the total moles of the silicon atom which constitutes the polysiloxane backbone.

4. The hydroxyl-functionalized unimodal polysiloxane polyalkyleneglycol brush copolymer according to claim 1, wherein the copolymer has a number average molecular weight (Mn) of from 1000 to 200,000 g/mol.

5. The hydroxyl-functionalized unimodal polysiloxane polyalkyleneglycol brush copolymer according to claim 1, wherein in Formula (I):
Z is selected from a $C_1$-$C_{20}$ alkylene group, a $C_6$-$C_{18}$ arylene group or a $C_6$-$C_{18}$ aralkylene group, which may contain at least one heteroatom; and/or
$R^7$ is selected from a $C_1$-$C_{12}$ alkyl group, a $C_3$-$C_{10}$ cycloalkyl group, a $C_6$-$C_{18}$ aryl group or a $C_6$-$C_{18}$ aralkyl group, which may contain at least one heteroatom; and/or
$R^{12}$ is $CR^a_2$ where each $R^a$ may be the same or different and is independently selected from hydrogen, a $C_1$-$C_{12}$ alkyl group, a $C_3$-$C_{10}$ cycloalkyl group, a $C_6$-$C_{18}$ aryl group or a $C_6$-$C_{18}$ aralkyl group, which may contain at least one heteroatom.

6. The hydroxyl-functionalized unimodal polysiloxane polyalkyleneglycol brush copolymer according to claim 1, wherein in Formula (I):
Z is a $C_1$-$C_{20}$ alkylene group which may contain at least one heteroatom; and/or
$R^7$ is a $C_1$-$C_8$ alkyl group; and/or
$R^{12}$ is $CR^a_2$ where each $R^a$ is hydrogen.

7. The hydroxyl-functionalized unimodal polysiloxane polyalkyleneglycol brush copolymer according to claim 1, wherein in Formula (I) each of $R^1$, $R^2$, $R^3$, $R^4$ and $R^5$ are independently selected from a $C_1$-$C_{12}$ alkyl group, a $C_3$-$C_{10}$ cycloalkyl group, a $C_6$-$C_{18}$ aryl group or a $C_6$-$C_{18}$ aralkyl group, which may contain at least one heteroatom.

8. The hydroxyl-functionalized unimodal polysiloxane polyalkyleneglycol brush copolymer according to claim 1, wherein in Formula (I) each of $R^1$, $R^2$, $R^3$, $R^4$ and $R^5$ are independently selected from a $C_1$-$C_8$ alkyl group.

9. The hydroxyl-functionalized unimodal polysiloxane polyalkyleneglycol brush copolymer according to claim 1, wherein in Formula (I) each of $R^1$, $R^2$, $R^3$, $R^4$ and $R^5$ are independently selected from a methyl group or phenyl group.

10. The hydroxyl-functionalized unimodal polysiloxane polyalkyleneglycol brush copolymer according to claim 1, wherein in Formula (I)
$R^8$, $R^9$ and $R^{11}$ are hydrogen; and
$R^{10}$ is either a phenyl group or a $C_1$-$C_8$ alkyl group.

11. A method for producing a hydroxyl-functionalized polysiloxane polyalkyleneglycol brush copolymer, wherein the polysiloxane backbone A contains less than 500 ppm mol % of SiH moiety based on the total moles of the silicon atom which constitutes the polysiloxane backbone, and said copolymer has a polydispersity index of from 1.3 to 5.0, comprising the steps of:

a) reacting a compound conforming to formula IV with a polyhydridosiloxane under anhydrous conditions and under catalysis of a transition metal catalyst of which the transition metal is selected from Groups 8 to 10 of the Periodic Table to provide a hydroxyl-functionalized polysiloxane prepolymer having Formula (II), Formula (II)

$$R^2\underset{R^1}{\overset{R^1}{\text{Si}}}-O-\left[\underset{R^3}{\overset{R^{12}\overset{Z}{\underset{\phantom{a}}{|}}\overset{R^7}{\underset{\phantom{a}}{\diagdown}}\text{CH-OH}}{\text{Si}}}-O\right]_{n1}\left[\underset{R^3}{\overset{R^{12}\overset{Z}{\underset{\phantom{a}}{|}}\overset{R^7}{\underset{\phantom{a}}{\diagdown}}\text{CH-OH}}{\text{Si}}}-O\right]-\left[\underset{R^3}{\overset{R^{12}H}{\text{Si}}}-O\right]_{n2}\left[\underset{R^3}{\overset{H}{\text{Si}}}-O\right]_{n3}\left[\underset{R^5}{\overset{R^4}{\text{Si}}}-O\right]_{p}\underset{R^1}{\overset{R^1}{\text{Si}}}R^2,$$

wherein:

Z is a covalent bond or selected from a polyoxyalkylene having a molecular weight of less than 10000 g/mol or a linear, branched or cyclic hydrocarbon residue having 1 to 20 carbon atoms which may contain at least one heteroatom, $R^1$, $R^2$, $R^3$, $R^4$ and $R^5$ may be the same or different and are independently selected from a linear, branched or cyclic hydrocarbon residue having 1 to 20 carbon atoms which may contain at least one heteroatom, $R^{12}$ is selected from a linear, branched or cyclic hydrocarbon residue having 1 to 20 carbon atoms which may contain at least one heteroatom, $R^7$ is selected from a linear, branched or cyclic hydrocarbon residue having 1 to 20 carbon atoms which may contain at least one heteroatom, n1 and n2 is an integer independently selected from 0 to 1000, with the proviso that not both of n1 and n2 are 0, n3 is an integer from 0 to 10, and p is an integer from 0 to 1000, said compound conforming to Formula (IV), and

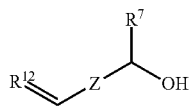

Formula (IV)

wherein Z, $R^{12}$ and $R^7$ are as defined above,
said polyhydridosiloxane conforms to Formula (V)

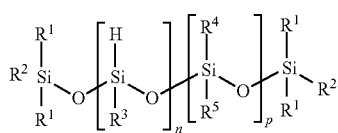

Formula (V)

wherein:
$R^1$, $R^2$, $R^3$, $R^4$, $R^5$ and p are as defined above; and
n is n1+n2+n3, and
b) in the presence of the obtained hydroxyl-functionalized polysiloxane prepolymer of Formula (II) and a catalyst, performing a ring-opening polymerization of at least one alkylene oxide monomer having Formula (III):

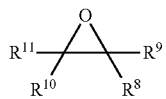

Formula (III)

wherein:
each $R^8$, $R^9$, $R^{10}$ and $R^{11}$ may be the same or different and are independently selected from hydrogen or a linear, branched or cyclic hydrocarbon residue having 1 to 20 carbon atoms which may contain at least one heteroatom.

12. The method according to claim 11, wherein the catalyst is an alkoxylation catalyst.

13. The method according to claim 11, wherein the alkoxylation catalyst is selected from the group consisting of alkali metal hydroxides, alkali earth metal hydroxides, alkali metal alkoxides, alkali earth metal alkoxides, and double metal cyanide complex.

14. The method according to claim 11, wherein the alkoxylation catalyst is a double metal cyanide complex.

\* \* \* \* \*

UNITED STATES PATENT AND TRADEMARK OFFICE
CERTIFICATE OF CORRECTION

Page 1 of 1

PATENT NO. : 11,879,037 B2
APPLICATION NO. : 17/338123
DATED : January 23, 2024
INVENTOR(S) : Andrea Gutacker et al.

It is certified that error appears in the above-identified patent and that said Letters Patent is hereby corrected as shown below:

In the Specification

Column 17, Line 11 change "$R^{19}$" to --$R^{10}$--.

Signed and Sealed this
Tenth Day of September, 2024

Katherine Kelly Vidal
*Director of the United States Patent and Trademark Office*